(12) United States Patent
Kroiss et al.

(10) Patent No.: US 10,370,009 B2
(45) Date of Patent: Aug. 6, 2019

(54) WHEEL SET FOR A RAIL VEHICLE

(71) Applicant: SIEMENS MOBILITY GMBH, Munich (DE)

(72) Inventors: Manuel Kroiss, Ebersbach (DE); Gerd Loeffler, Empersdorf (AT)

(73) Assignee: Siemens Mobility GmbH, Munich (DE)

( * ) Notice: Subject to any disclaimer, the term of this patent is extended or adjusted under 35 U.S.C. 154(b) by 317 days.

(21) Appl. No.: 15/112,203

(22) PCT Filed: Jan. 9, 2015

(86) PCT No.: PCT/EP2015/050321
§ 371 (c)(1),
(2) Date: Jul. 18, 2016

(87) PCT Pub. No.: WO2015/107005
PCT Pub. Date: Jul. 23, 2015

(65) Prior Publication Data
US 2016/0332484 A1    Nov. 17, 2016

(30) Foreign Application Priority Data
Jan. 17, 2014   (DE) .................. 10 2014 200 835

(51) Int. Cl.
*B61F 5/26*   (2006.01)
*F16C 35/04*  (2006.01)
(Continued)

(52) U.S. Cl.
CPC ............... *B61F 5/26* (2013.01); *B60B 37/10* (2013.01); *B61F 5/30* (2013.01); *F16C 35/042* (2013.01);
(Continued)

(58) Field of Classification Search
CPC . B60B 37/10; B60B 17/00; B61F 5/30; B61F 5/26; B61F 15/26; B61F 15/22;
(Continued)

(56) References Cited

U.S. PATENT DOCUMENTS 1,908,956 A * 5/1933 Chievitz ................. B61F 15/14
                                                  277/347
3,560,031 A * 2/1971 Gilmour, Jr. ............ B60B 11/02
                                                   301/1
(Continued)

FOREIGN PATENT DOCUMENTS

BE          822544 A1     3/1975
DE          7313477 U     7/1973
(Continued)

OTHER PUBLICATIONS

Hegenscheidt-MFD GmbH & Co. KG, Erkelenz "Mobiles Radsatzbearbeitungssystem Typ MOBITURN 2", S. 1-8.
(Continued)

*Primary Examiner* — S. Joseph Morano
*Assistant Examiner* — Scott A Browne
(74) *Attorney, Agent, or Firm* — Laurence Greenberg; Werner Stemer; Ralph Locher

(57) ABSTRACT

A wheel set for a rail vehicle, in particular for a locomotive, includes two track wheels which are connected by a wheel axle mounted in two wheel set bearings. Each wheel set bearing includes a cast bearing housing, which is closed by an outer housing cover and an inner pressure ring. In addition, the bearing housing has a clamping position for engaging a tensioning device of a machine tool for machining the wheel set. Since the clamping position is integrated in the pressure ring, the clamping position can be easily cut
(Continued)

to size and the bearing housing can be produced in a weight-optimized and cost-effective way in comparison to known bearing housings.

5 Claims, 2 Drawing Sheets

(51) Int. Cl.
  *B61F 5/30* (2006.01)
  *B60B 37/10* (2006.01)
  *B23B 5/32* (2006.01)
  *B60B 17/00* (2006.01)

(52) U.S. Cl.
  CPC ............... *F16C 35/045* (2013.01); *B23B 5/32* (2013.01); *B60B 17/00* (2013.01)

(58) Field of Classification Search
  CPC .......... B61F 15/28; B61F 15/30; B61F 15/32; B61F 15/20; B23B 5/32; F16C 35/045; F16C 35/047; F16C 35/08
  USPC ................................................ 295/42.2, 42.1
  See application file for complete search history.

(56) References Cited

U.S. PATENT DOCUMENTS

| 3,741,603 A | * | 6/1973 | McLean, Jr. | B61F 15/22 |
| | | | | 295/42.2 |
| 3,802,352 A | * | 4/1974 | Keller | B60B 37/10 |
| | | | | 105/181 |
| 4,674,370 A | | 6/1987 | Gutoehrlein et al. | |
| 5,174,218 A | * | 12/1992 | List | B61D 3/10 |
| | | | | 105/167 |
| 5,611,284 A | | 3/1997 | Smith et al. | |

FOREIGN PATENT DOCUMENTS

DE        2805407 A1    11/1978
JP     2010018200 A  *   1/2010

OTHER PUBLICATIONS

Fag; Waelzlager Fag Radsatzlager in der dieselelektrischen Lokomotive "Herkules"; Publ.-Nr WL 07520 DA/98.5/08/02; XP055181438; www.schaeftler.com/remotemedien/media/_shared_media/08_media_library/Ol_publicatTons/scnaeffler_2/publTcation/downlads_18/w1_07520_de_de.pdf; 2007.

* cited by examiner

WHEEL SET FOR A RAIL VEHICLE

BACKGROUND OF THE INVENTION

Field of the Invention

The invention relates to a wheel set for a rail vehicle, in particular for a locomotive, including two track wheels which are connected by a wheel axle mounted in two wheel set bearings, each wheel set bearing having a cast bearing housing which is closed by an outer housing cover and an inner pressure ring, and a clamping position for engaging a tensioning device of a machine tool for machining the wheel set.

A wheel set for a rail vehicle, for example a locomotive or a multiple unit, comprises two track wheels which are connected via a wheel axle mounted in two wheel set bearings. In this case each wheel set bearing has a cast bearing housing which is closed from the outside by a housing cover and from the inside by a pressure ring in respect of the wheel axle. Furthermore, a clamping position is arranged in the region of each wheel set bearing, into which tensioning means of a machine tool for clamping the wheel set engage while the wheel set is being machined. A machine tool is a specialized lathe for reprofiling the tires of track wheels or for reworking shaft and/or wheel brake disks. Machine tools can be permanently installed underfloor in a foundation pit of the workshop or can be designed for mobile travel on a workshop track underneath an elevated rail vehicle.

Known from German product literature "Mobiles Radsatzbearbeitungssystem Typ MOBITURN2: Das erste and einzige mobile Radsatzbearbeitungssystem der Welt" [Mobile wheel set machining system Type MOBITURN2: The world's first and only mobile wheel set machining system], published by Hegenscheidt-MFD GmbH & Co. KG under publication number GP077 HM-PC 09.08, is a machine tool which can be brought by rail or road/rail transport to various locations, where it can be unloaded or loaded by crane. If required the machine tool can be moved by a marshaling vehicle on the rail network from a standby position to the respective location, where it positions itself by its own propulsion underneath the wheel sets of the elevated rail vehicle. The machine tool comprises an integrated energy station and control unit which are connected to the workshop's energy supply system by electric cable by means of a plug-in connection. While the wheel set is being machined the rail vehicle is lifted and held in the engagement points of the lifting jacks, as a result of which the machine tool itself is kept free of weight forces of the rail vehicle. To drive the wheel set use is made of the friction roller principle, wherein the necessary friction is produced between drive roller and wheel set thanks to a closed polygon of forces between the wheel set and the machine tool. To this end the machine tool is pulled toward the wheel set using a coupling device between machine tool and bearing housing such that an optimum friction arises between track wheel and drive roller.

To clamp the wheel set, tensioning arms engage the coupling device in clamping positions which are arranged in the region of the wheel set bearings. Thus known from German product literature "FAG Radsatzlager in der dieselelektrischen Lokomotive Herkules" [FAG wheel set bearings in the Herkules diesel-electric locomotive], published by FAG Kugelfischer Georg Schäfer AG under publication number WL 07520 DA/98.5/08/02, is a wheel set bearing with a cast bearing housing. The bearing housing has a cylindrical housing part, into which the wheel axle fits and is mounted in roller bearings. Integrally molded onto the cylindrical housing part are two supporting disks for the primary suspension. Two supporting webs designed to be trapezoid project downward in parallel to one another from the cylindrical housing part and from the supporting disks. Each supporting web has two adjacent clamping straps for receiving the clamping arms, wherein corresponding clamping straps of both the supporting webs are aligned with one another.

BRIEF SUMMARY OF THE INVENTION

The object of the invention is to provide a generic wheel set, the production cost of which is optimized without the loss of any functions.

The object is inventively achieved by a wheel set of the type referred to in the introduction, in which the clamping position is integrated in the pressure ring.

Thus a wheel set for a rail vehicle, in particular for a locomotive, comprises two track wheels. The track wheels are connected via a wheel axle mounted in two wheel set bearings. Each wheel set bearing has a cast bearing housing which is closed by an outer housing cover and an inner pressure ring. Each wheel set bearing additionally has a clamping position for engaging tensioning means of a machine tool for machining the wheel set. According to the invention the clamping position is integrated in the pressure ring of the wheel set bearing. This means the clamping positions on the bearing housing can be omitted, as a result of which the casting can be implemented with a smaller volume and simpler geometry. This means initially the casting mold can be produced more conveniently, but above all there is a saving on material costs for the cast bearing housing. Another advantage is that by omitting integrally cast clamping positions there is an accompanying weight reduction of the bearing housing and thus of the entire wheel set. By integrating the clamping positions in the pressure ring, these are inventively displaced into an existing and easily modified component on the wheel set bearing, which can be cut by turning and/or milling.

In an advantageous embodiment of the inventive wheel set the clamping position is formed by at least one radially projecting clamping strap on an outer circumference of the pressure ring. In the mounted state of the pressure ring the clamping strap projects downward. The clamping strap is designed such that clamping arms can engage in a form-fit manner; it can for example be designed as hook-shaped or have an opening.

Preferably the clamping position of the inventive wheel set is formed by two radially projecting clamping straps on the outer circumference of the pressure ring, which are arranged to lie diametrically opposite. This prevents an imbalance when the pressure ring is being machine-turned. A pressure ring configured in this way additionally has two comparable mounting positions, which simplifies its assembly. Moreover, when one of the clamping straps is abraded or damaged the other one of the clamping straps can be used, thanks to the pressure ring being fitted rotated by 180°, without a new pressure ring having to be mounted.

In a preferred embodiment of the inventive wheel set a clamping strap has at least one through-hole for engaging the tensioning means. In this case the clamping strap is only tensioned by the clamping forces of the clamping arms. For example, the clamping strap can also have two through-holes which are arranged approximately next to one another.

In an advantageous embodiment of the inventive wheel set the pressure ring has an annular collar which sits in an annular groove of the bearing housing, wherein clamping forces can be transferred from the pressure ring to the bearing housing via the seat of the collar in the groove. This for example prevents screwed connection means between pressure ring and bearing housing being exposed to sheer stress when the wheel set is clamped.

BRIEF DESCRIPTION OF THE SEVERAL VIEWS OF THE DRAWING

Further properties and advantages of the invention emerge from the following description of an exemplary embodiment on the basis of the drawings, in which, schematically illustrated

DESCRIPTION OF THE INVENTION

Figure 1:
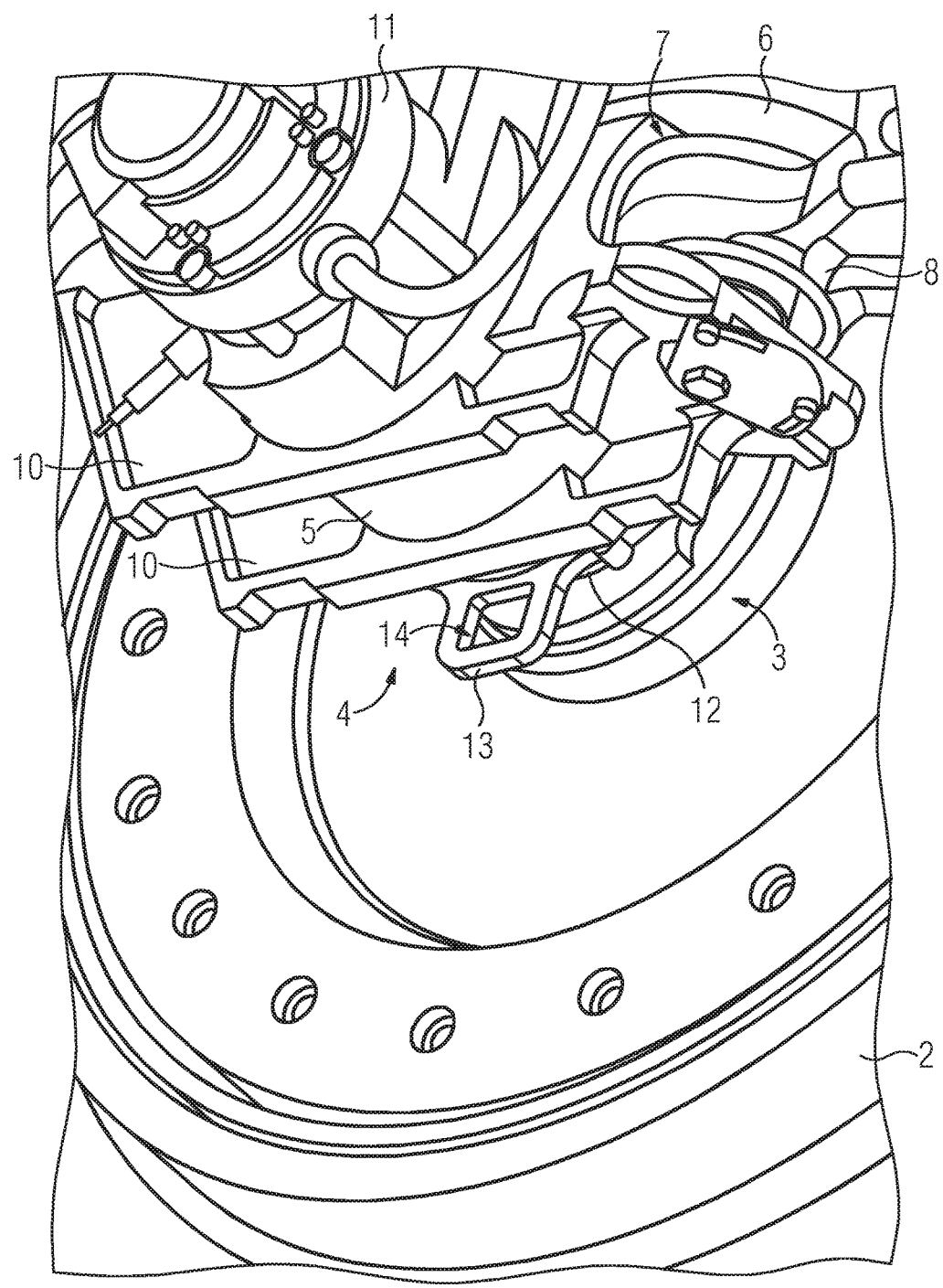
FIG. 1 shows a perspective view of an inventive wheel set in the region of the wheel set bearing and FIG. 2 shows the wheel set according to FIG. 1 in a bottom view.
Figure 2:
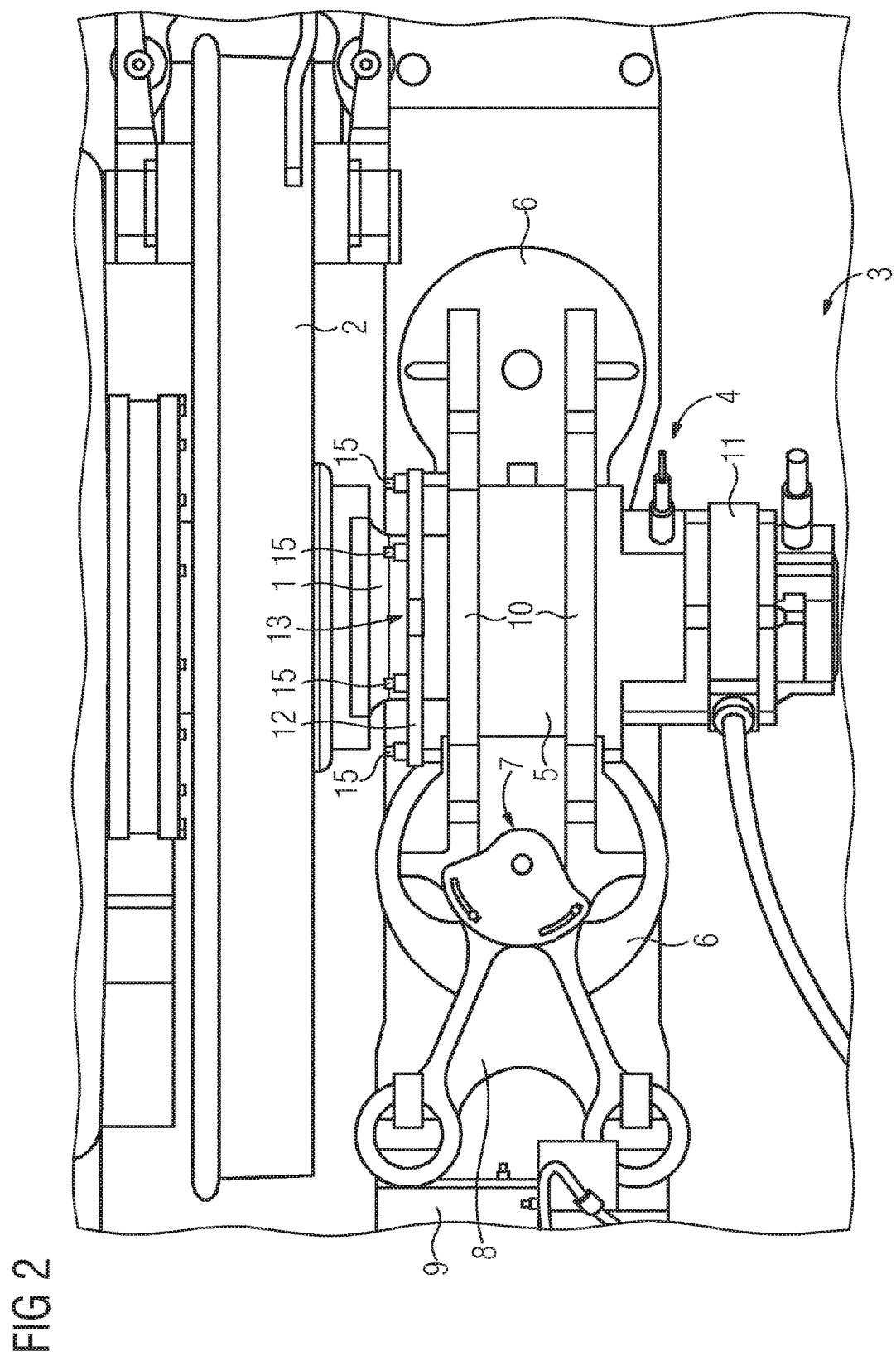

According to FIG. 1 and FIG. 2 a wheel set for a rail vehicle (not illustrated), in particular for a locomotive or a multiple unit, comprises two track wheels 2 connected via a wheel axle 1. The wheel axle 1 designed as an axle shaft is mounted at both its ends in a wheel set bearing 3 in each case. A wheel set bearing 3 has a roller bearing (not illustrated), the inner ring of which sits on the wheel axle 1 and the outer ring of which sits in a bearing housing 4. The bearing housing 4 is embodied as a casting with a complex geometry. It has a cylinder part 5, into which the wheel axle 1 fits. Furthermore, it has two integrally cast supporting disks 6 as a seat for the primary suspension (not illustrated). Underneath one of the supporting disks 6 the bearing housing 4 has an integrally cast fastening position 7 for a triangular guide 8, via which the wheel set is guided on the bogie frame 9. Finally the bearing housing 4 has two integrally cast supporting webs 10, which are designed to be trapezoid and project downward in parallel from the cylinder part 5 and from the supporting disks 6. The cylinder part 5 open at the end face is closed externally by a housing cover 11 and internally by a pressure ring 12 in respect of the wheel axle 1.

To clamp the wheel set while it is being machined by a machine tool, for instance for reprofiling the tires of the track wheel 2, the pressure ring 12 inventively has a clamping strap 13 which projects downward. The clamping strap 13 acts as a clamping position for engaging tensioning means of the machine tool, for instance clamping arms of a specialized lathe, and is formed as a material overlap with a through-hole 14 radially projecting on the outer circumference of the pressure ring 12. A further clamping strap 13 can also be arranged on the outer circumference of the pressure ring 12, diametrically opposite to the other clamping strap 13. The pressure ring 12 has an annular collar which sits in an annular groove of the bearing housing 4. Clamping forces can be transferred via the seat of the collar in the groove from the pressure ring 12 to the bearing housing 4, without imposing sheer stress on fastening screws 15 for fastening the pressure ring 12 on the bearing housing 4. By integrating the clamping position in the pressure ring 12 a wheel set is provided which can be produced cost-effectively and is weight-optimized.

The invention claimed is:

1. A wheel set for a rail vehicle or a locomotive, the wheel set comprising:
    two wheel set bearings each having a cast bearing housing;
    two track wheels;
    a wheel axle interconnecting said two track wheels and being mounted in said two wheel set bearings;
    each bearing housing having a respective outer side with an outer housing cover and a respective inner side opposite said respective outer with respect to a longitudinal direction of said wheel axle, said respective inner side having an inner pressure ring;
    each said inner pressure ring having a respective outside diameter;
    fasteners disposed about an outer periphery of each said inner pressure ring within said respective outside diameter for fastening each said inner pressure ring to said respective inner side; and
    each said inner pressure ring having a clamping structure integrated therein for engaging a tensioning device of a machine tool for machining the wheel set, said clamping structure being at least one clamping strap projection projecting radially outward from said respective outside diameter.

2. The wheel set according to claim 1, wherein said clamping structure is formed by two diametrically oppositely disposed clamping straps radially projecting on an outer periphery of said pressure ring.

3. The wheel set according to claim 1, wherein said clamping strap has at least one through-hole for engaging the tensioning device.

4. The wheel set according to claim 1, wherein said clamping strap extends radially downward from said inner pressure ring.

5. The wheel set according to claim 4, wherein said clamping strap is constructed for being engaged by clamping arms of a lathe.

* * * * *